(12) United States Patent
Sathyanarayana et al.

(10) Patent No.: US 10,489,222 B2
(45) Date of Patent: Nov. 26, 2019

(54) DISTRIBUTED COMPUTING RESOURCE MANAGEMENT

(71) Applicant: Nauto, Inc., Palo Alto, CA (US)

(72) Inventors: Suchitra Sathyanarayana, Palo Alto, CA (US); Stefan Heck, Palo Alto, CA (US); Rohit Saboo, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 0 days.

(21) Appl. No.: 16/285,013

(22) Filed: Feb. 25, 2019

(65) Prior Publication Data

US 2019/0266029 A1 Aug. 29, 2019

Related U.S. Application Data

(60) Provisional application No. 62/768,822, filed on Nov. 16, 2018, provisional application No. 62/645,088, filed on Mar. 19, 2018, provisional application No. 62/634,300, filed on Feb. 23, 2018.

(51) Int. Cl.
*G06F 9/54* (2006.01)
*G07C 5/00* (2006.01)

(52) U.S. Cl.
CPC .............. *G06F 9/542* (2013.01); *G07C 5/008* (2013.01)

(58) Field of Classification Search
CPC ........................................................ G06F 9/542
USPC .......................................................... 719/318
See application file for complete search history.

(56) References Cited

U.S. PATENT DOCUMENTS

| 9,390,567 | B2 * | 7/2016 | Kim .................... G07C 5/008 |
| 9,934,625 | B1 * | 4/2018 | Wahba .................... B60R 21/00 |
| 2014/0160291 | A1 | 6/2014 | Schaffner | |
| 2017/0010106 | A1 | 1/2017 | Shashua et al. | |
| 2017/0041359 | A1 | 2/2017 | Kwan | |
| 2018/0012082 | A1 | 1/2018 | Satazoda et al. | |
| 2018/0012092 | A1 | 1/2018 | Glesson-May et al. | |
| 2018/0045519 | A1 | 2/2018 | Ghadiok et al. | |
| 2019/0079659 | A1 * | 3/2019 | Adenwala ........... G06F 3/04842 |
| 2019/0102689 | A1 * | 4/2019 | Lassoued ............... G06N 5/048 |
| 2019/0135303 | A1 * | 5/2019 | Kim .................... B60W 50/085 |

OTHER PUBLICATIONS

Cohen. "Event-Based Feature Detection, Recognition and Classification" Jan. 2017. retrieved on Apr. 21, 2019 from https://tel.archives-ouvertes.fr/tel-01426001/document.
Teeerapittayanon, Surat et al. "Distributed Deep Neural Networks over the Cloud, the Edge and End Devices", icdcs, 2017, 12 pages.
Tomer, Toledo , et al., "In-Vehicle Data Recorder for Evaluation of Driving Behavior and Safety", Transportation Research Record: Journal of the Transportation Research Board, No. 1953, Transportation Research Board of the National Academies, Washington D.C., 2006, pp. 112-119.

* cited by examiner

*Primary Examiner* — Andy Ho
(74) *Attorney, Agent, or Firm* — Perkins Coie LLP; Michael A. Glenn

(57) ABSTRACT

Systems and methods for distributed event detection. Sensor data is synchronized, and an on-board detector included in a vehicle detects an event from the synchronized sensor data. The synchronized sensor data is transmitted to a remote system. At the remote system, a remote detector detects the event and generates a remote label from at least a data subset of the synchronized sensor data.

20 Claims, 5 Drawing Sheets ial Application No. 62/645,088 filed 19 Mar. 2018, and
DISTRIBUTED COMPUTING RESOURCE MANAGEMENT

CROSS-REFERENCE TO RELATED APPLICATIONS

This application claims the benefit of U.S. Provisional Application No. 62/768,822 filed 16 Nov. 2018, U.S. Provisional Application No. 62/645,088 filed 19 Mar. 2018, and U.S. Provisional Application No. 62/634,300 filed 23 Feb. 2018, which are incorporated in their entirety by this reference.

TECHNICAL FIELD

This invention relates generally to the automotive data analysis field, and more specifically to a new and useful system and method for distributed data analysis in the automotive data analysis field.

BACKGROUND

In the field of automotive control and data utilization, and often in relation to autonomous and/or semi-autonomous vehicles, it is important to obtain naturalistic (e.g., real-world) data regarding vehicle events that can be used to develop systems for vehicle control. However, real-world vehicle events of interest are sparse and difficult to isolate from continuously collected real-world data, because the total real-world datasets from driving sessions often contain redundancies and/or large quantities of irrelevant or less-relevant information as related to vehicle events. Furthermore, the real-world data is typically collected at the "edge" of the computational network (e.g., in the vehicle during driving), where computing power and storage is limited (e.g., by physical constraints, thermal constraints, power constraints, etc.), and often substantially processed and/or stored in the cloud (e.g., at a remote computing system), which is associated with communication latency and bandwidth costs. However, it is also desirable to meet accuracy requirements at the computing edge, and latency/cost requirements associated with cloud computing.

Thus, there is a need in the automotive field to create a new and useful method for distributed data analysis. This invention provides such a new and useful method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
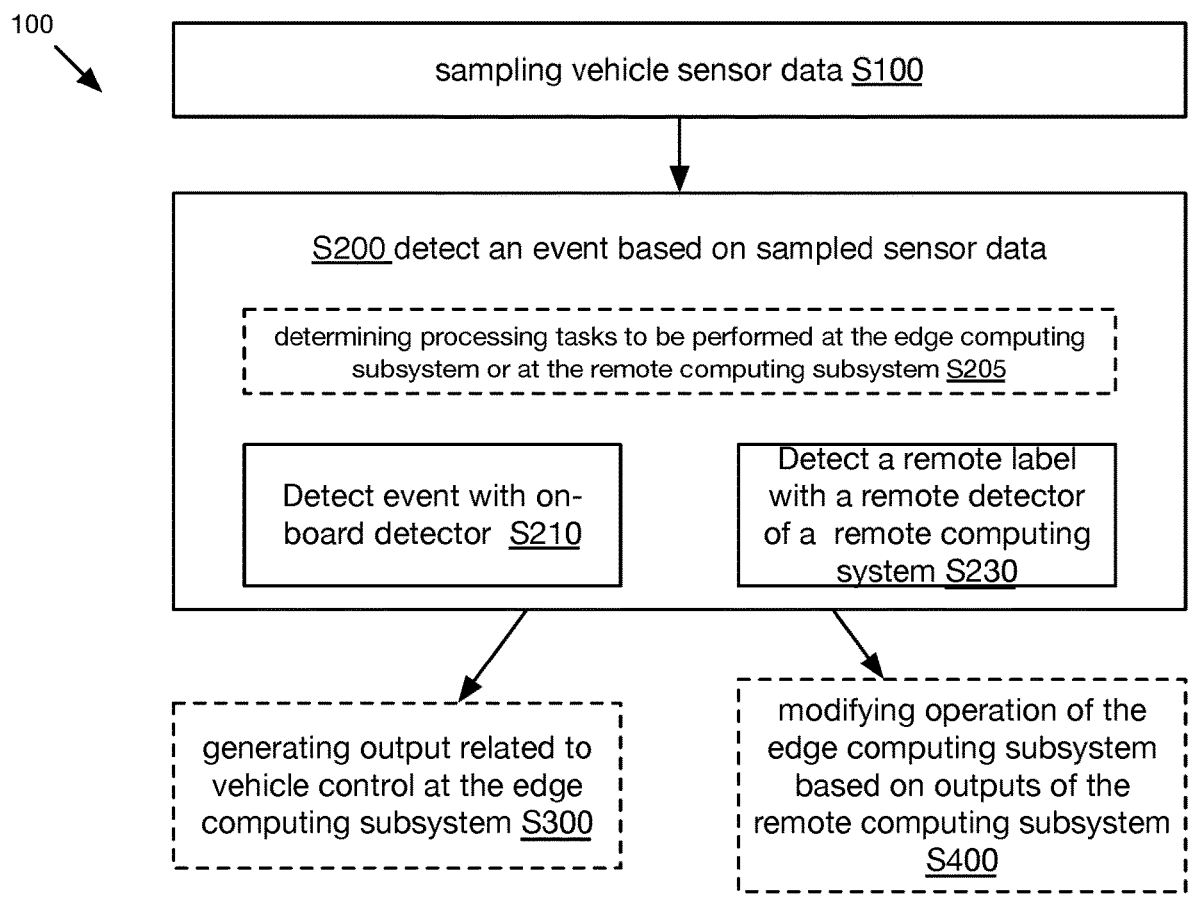
FIG. 1 depicts a flowchart of a variation of the method for distributed data analysis.
Figure 3A:
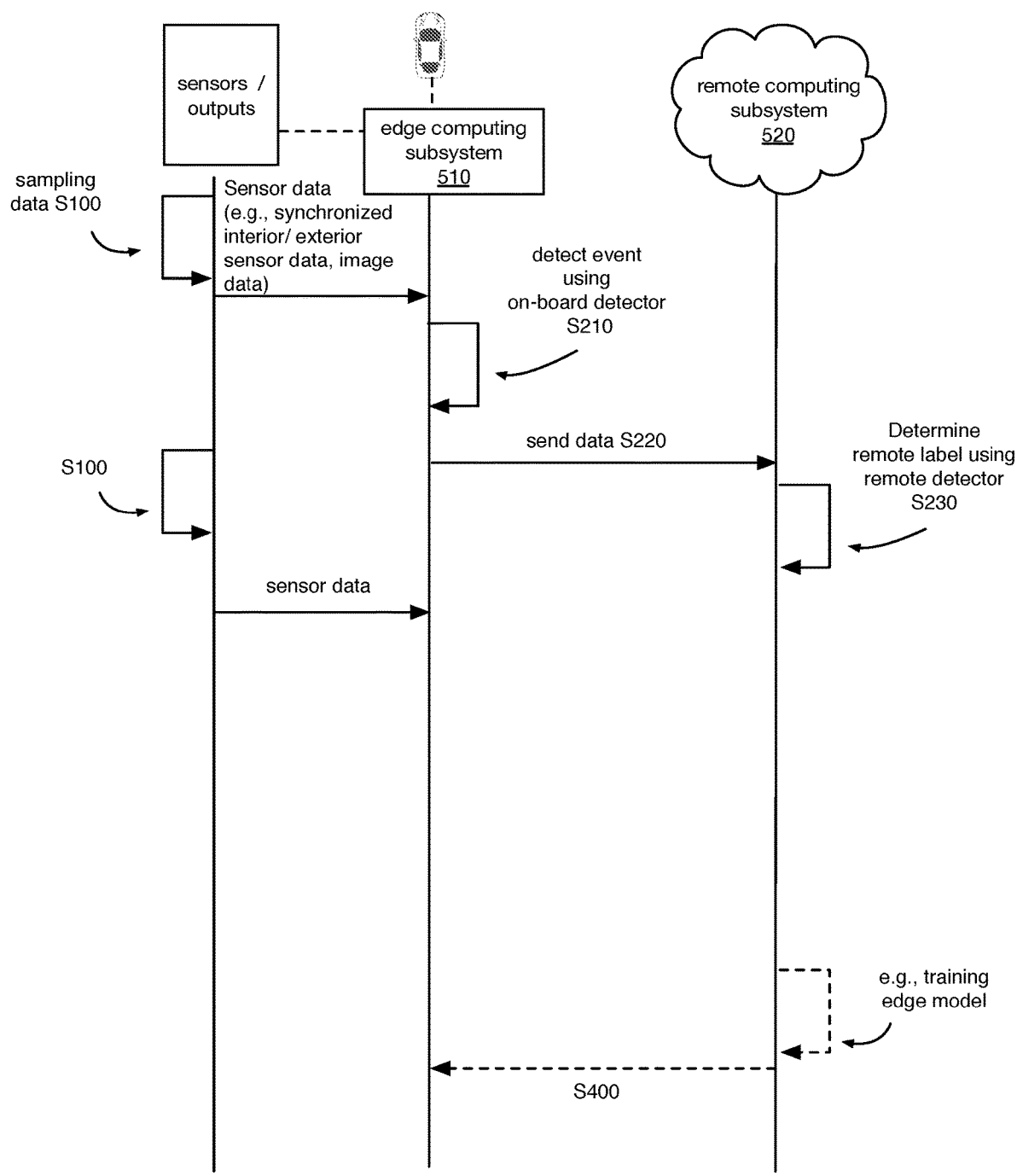
FIGS. 3A-B depict flowcharts of variations of the method for distributed data analysis.
Figure 3B:
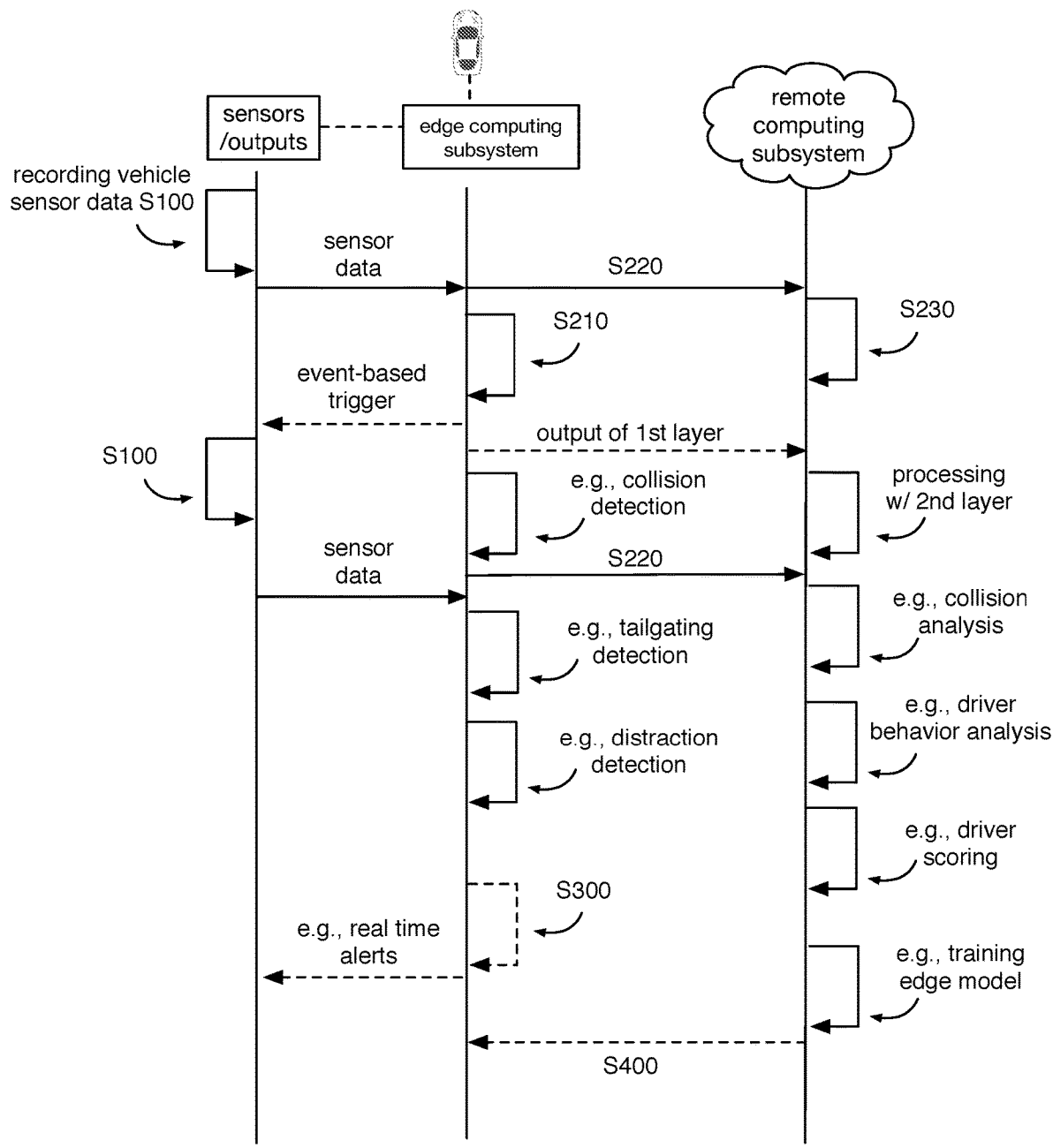

As shown in FIGS. 1 and 3, the method 100 for distributed computational resource management includes: collecting vehicle sensor data S100; and, processing the vehicle sensor data using an edge computing subsystem and a remote computing subsystem S200.

The method 100 can optionally include: generating output related to vehicle control at the edge computing subsystem S300; and, modifying operation of the edge computing subsystem based on outputs of the remote computing subsystem S400.

The method 100 functions to perform distributed vehicle event data analysis. The method 100 can also function to reduce computational latency of vehicle event data analysis at the vehicle (e.g., at the edge computing subsystem located in the vehicle) while simultaneously enhancing computational accuracy of vehicle event data analysis performed remotely from the vehicle (e.g., at a remote computing subsystem in communication with the edge computing subsystem). The method 100 can also function to identify and/or analyze vehicle events as they occur in real-time (e.g., near real-time, substantially real-time, etc.) across a population of vehicles. However, the method 100 can additionally or alternatively have any other suitable function.

2. Benefits

Variations of the technology can afford several benefits and/or advantages.

First, variants of the technology can reduce data redundancy in inputs provided to machine learning models (e.g., learning networks, deep learning networks, convolutional neural networks, etc.). For example, the method can include collecting vehicle event data at an edge computing subsystem based on an event trigger (e.g., detecting a vehicle event such as a driving maneuver or near-collision at onset, in real-time, in near-real time, etc.) such that the vehicle event data is automatically identified (e.g., by vehicle event type such as hard braking, passing a neighboring vehicle, participating in a near-collision, etc.) and/or labeled with the event data used to trigger data collection, logging, and/or transmission (e.g., to a remote computing system). Such variants of the method can include providing the event triggered data to a remote computing subsystem for further analysis, which can improve the performance of the remote computing subsystem and/or computational models implemented therein (e.g., accuracy, false positive rate, false negative rate, algorithm execution time, number of processor cycles to execute an algorithm, etc.) by pre-processing the vehicle event data at the edge computing subsystem (e.g., by automatically labeling the data as associated with the vehicle event used to trigger the data collection, by executing a less complex processing scheme and providing the outputs thereof to a more complex processing scheme executing at the remote computing subsystem, etc.).

Second, variants of the technology can provide improvements to problems rooted in computer technology. Computing resources (e.g., processing speed, parallel processing bandwidth, high speed memory, etc.) are often limited on edge-computing devices whereas processing data at a remote computing system requires transmission (e.g., associated with transmission latency), data storage and/or retrieval, and variants of the method can divide processing responsibilities between the edge computing devices and a centralized computing subsystem to devote edge computing resources to processing that requires lower processing power and low latency and to devote centralized computing resources to processing that requires higher processing power and is less time-critical (e.g., wherein analysis can be performed subsequent to event occurrence in non-real time).

Third, variations of the technology can improve thermal performance of components of edge computing devices. For example, reducing the computational demands of processor(s) at an edge computing device (e.g., an onboard vehicle system) can prevent overheating of integrated heat-sensitive components (e.g., cameras, on-chip sensors, memory devices, the processors themselves, etc.) and concomitant reductions in performance or damage.

However, variations of the technology can offer any other suitable benefits and/or advantages.

3. Method

As shown in FIG. 1, the method 100 for distributed computational resource management includes: collecting vehicle sensor data S100; and, processing the vehicle sensor data using an edge computing subsystem and a remote computing subsystem S200. The method 100 can optionally include: generating output related to vehicle control at the edge computing subsystem S300; and, modifying operation of the edge computing subsystem based on processing outputs of the remote computing subsystem S400.

The method 100 can include the collection and processing of vehicle event data. Vehicle event data can include any data related to vehicle operation (e.g., vehicle operational data), driver behavior, vehicular traffic (e.g., near-miss or near-collision events; traffic operations such as merging into a lane, changing lanes, turning, obeying or disobeying traffic signals, etc.), data describing non-vehicular objects (e.g., pedestrian data such as location, pose, and/or heading; building locations and/or poses, etc.), environmental data (e.g., describing the surroundings of the vehicle, ambient light level, ambient temperature, etc.), and any other suitable data. Vehicle operational data is preferably collected onboard the vehicle (e.g., at an onboard vehicle system, a vehicle computing unit, an electronic control unit, a processor of the onboard vehicle system, a mobile device onboard the vehicle, etc.), but can additionally or alternatively be performed at a remote computing system subsequent to (and/or simultaneously with) transmission of gathered vehicle sensor data to a remote computing system (e.g., over a cellular radio channel). Driver and/or operator behavioral or other data included in vehicle event data can include: operator profiles (e.g., history, driver score, etc.); operator behavior (e.g., user behavior), such as distraction level, expressions (e.g., surprise, anger, etc.), responses or actions (e.g., evasive maneuvers, swerving, hard braking, screaming, etc.), cognitive ability (e.g., consciousness), driving proficiency, willful behavior (e.g., determined from vehicle control input positions), attentiveness, gaze frequency or duration in a predetermined direction (e.g., forward direction), performance of secondary tasks (e.g., tasks unrelated to driving, such as talking on a cell phone or talking to a passenger, eating, etc.), or other behavior parameters; or any other suitable operator parameter. The driver and/or operator data is preferably determined by the remote computing system (e.g., based on raw data sampled by the onboard data collection system that is streamed or asynchronously sent to the remote computing system, auxiliary data such as driver schedules, user profiles, etc.), but can alternatively or additionally be determined by the onboard system (e.g., from an onboard database and a driver or operator identifier determined from a beacon, such as a short-range communication device, tag, manually-entered identifier, or otherwise determined), or by any suitable system. However, vehicle event data can include any other suitable data.

The method 100 can be performed (e.g., executed, implemented, etc.) in real- or near-real time, but all of the method, portions of the method, and/or instances of the method can alternatively be performed asynchronously or at any other suitable time. The method is preferably iteratively performed at a predetermined frequency (e.g., every millisecond, at a sampling frequency, etc.), but can alternatively be performed in response to occurrence of a trigger event (e.g., detection of a collision, detection of a near-collision, change in the vehicle attitude, change in user distraction levels, receipt of driving session information, receipt of new sensor information, physical vehicle entry into a geographic region associated with high collision risk, object proximity detection, detection of an onset or end of a driving session, etc.), be performed a single time for a driving session, be performed a single time for the vehicle, or be performed at any other suitable frequency.

The method is preferably performed in part by a computing system (e.g., 510, shown in FIG. 2) on-board the vehicle (e.g., an edge-computing subsystem, an onboard vehicle system, etc.) and in part by a computing system (e.g., remote computing system 520, shown in FIG. 2) in communication with the onboard vehicle system (e.g., a remote computing subsystem, a cloud computing subsystem, etc.), but can alternatively be partially or entirely performed by a user device, such as a smartphone, or by any other suitable set of computing systems distributed or arranged in any suitable manner. The method is preferably performed using data sampled by the onboard vehicle system, but can additionally or alternatively be performed using vehicle data (e.g., signals sampled by the vehicle sensors), other vehicles' data (e.g., received from the source vehicle or a remote computing system), aggregate population data, historic data (e.g., for the vehicle, driver, geographic location, retrieved from a database onboard or remote from the vehicle, etc.), or any other suitable data from any other suitable source.

The onboard vehicle system (e.g., 510, shown in FIG. 2) can include a processing system (e.g., a set of GPUs, CPUs, microprocessors, TPUs, etc.), storage system (e.g., RAM, Flash), communication system, sensor set, power system (e.g., battery, vehicle power connector, photovoltaic system, etc.), housing, or any other suitable component. The communication system can include telemetry systems (e.g., for vehicle-to-vehicle, vehicle-to-infrastructure, vehicle-to-remote computing system, or other communications), wireless systems (e.g., cellular, WiFi or other 802.11x protocols, Bluetooth, RF, NFC, etc.), wired systems (e.g., Ethernet, vehicle bus connections, etc.), or any other suitable communication systems. The sensors can include: cameras (e.g., wide angle, narrow angle, or having any other suitable field of view; visible range, invisible range, IR, multispectral, hyperspectral, or sensitive along any suitable wavelength; monocular, stereoscopic, or having any suitable number of sensors or cameras; etc.), kinematic sensors (e.g., accelerometers, IMUs, gyroscopes, etc.), optical systems (e.g., ambient light sensors), acoustic systems (e.g., microphones, speakers, etc.), range-finding systems (e.g., radar, sonar, TOF systems, LIDAR systems, etc.), location systems (e.g., GPS, cellular trilateration systems, short-range localization systems, dead-reckoning systems, etc.), temperature sensors, pressure sensors, proximity sensors (e.g., range-finding systems, short-range radios, etc.), OBD scanners (e.g., wirelessly connectable to the onboard vehicle system, integrated into the onboard vehicle system, etc.), or any other suitable set of sensors.

In some variations, an on-board detector generates an on-board label in response to detecting a vehicle event from synchronized interior image data and exterior image data of the vehicle (e.g., 501).

In some variations, the onboard vehicle system (e.g., 510, shown in FIG. 2) stores a set of analysis algorithms (models, detectors, on-board detectors, e.g., 511). Each analysis algorithm functions to detect a vehicle event from the sensor data, such as the synchronized interior image data and exterior image data of the vehicle (e.g., 501, shown in FIG. 2). Different analysis algorithms preferably detect different vehicle events, but multiple analysis algorithms can detect the same event, an analysis algorithm can detect multiple events, or have any suitable relationship with the remainder of the analysis algorithms. In some variations, analysis algorithms (detectors) include image processing algorithms (e.g., downsampling algorithms, etc.), image analysis algorithms (e.g., object detectors, feature detectors, pose detectors, object trackers, etc.), event detectors (e.g., near-collision detectors, collision detectors, distraction detectors, tailgating detectors, etc.), alert generators (e.g., that generate a set of alerts for a given event based on driving context, etc.), or any other suitable set of analysis algorithms. In a specific example, the near-collision detector can execute the method disclosed in U.S. application Ser. No. 15/705,043 filed 14 Sep. 2017, incorporated herein in its entirety; however, near-collision events can be otherwise determined. Each of the analysis algorithms (detectors) can have a prioritization, wherein higher-prioritized algorithms can be preferentially executed and/or lower-prioritized algorithms can be preferentially shut down based on operation parameters (e.g., thermal parameters, computational availability, etc.). The prioritization can be predetermined, dynamically determined based on driving context (and/or detected vehicle events), specified by the remote computing system, or otherwise determined. Alternatively, the analysis algorithms (detectors) can be unprioritized.

The algorithms (on-board detector, e.g., 511 shown in FIG. 2) stored at the onboard vehicle system can be: a smaller version of the algorithm (remote detector, e.g., 521 shown in FIG. 2) stored and/or executed by the remote computing system (e.g., 520), the first several layers of the remote computing system's algorithm, precursor algorithms to the remote computing system's algorithms, a different algorithm (e.g., different detector, using a different model) from that of the remote algorithm (e.g., remote detector) for the same event or feature, or be otherwise related to the remote computing system's algorithms. Each local algorithm preferably has a remote algorithm counterpart, but the onboard system can alternatively have more or different algorithms, as compared to the remote computing system. The local algorithm(s) (e.g., onboard detector, analysis algorithm, etc.) are preferably smaller than the remote algorithm(s) (e.g., in data size), but can alternatively be the same size or larger. The local algorithm(s) preferably require less processing power than the remote algorithm(s), but can alternatively require more processing power (e.g., to process the same information, to detect the same event). The local algorithm(s) are preferably faster than the remote algorithm(s) (e.g., lower latency), but can alternatively be the same speed or slower (e.g., higher latency than the remote detector). The local algorithm(s) preferably have worse performance metrics than the remote algorithm(s) (e.g., lower recall, lower accuracy, lower precision, etc.), but can alternatively have the same performance or better performance (e.g., higher recall, higher accuracy, higher precision, etc.). However, the local algorithm(s) can be otherwise related to the remote algorithm(s).

The set of algorithms executed at any given time can be determined (e.g., selected) by the onboard vehicle system, always executed (e.g., multiple detectors executed in parallel by the onboard vehicle system), or executed at any suitable time. Alternatively or additionally, the analysis algorithm can be selected by the remote computing system (e.g., wherein the algorithm identifier is sent to the onboard vehicle system for execution), can be determined by the remote computing system (e.g., wherein the analysis algorithm is sent to the onboard vehicle system), can be modified by the remote computing system (e.g., wherein the weights and/or layer identifiers for the analysis algorithm are sent to the onboard vehicle system), or otherwise specified by the remote computing system.

Figure 2:
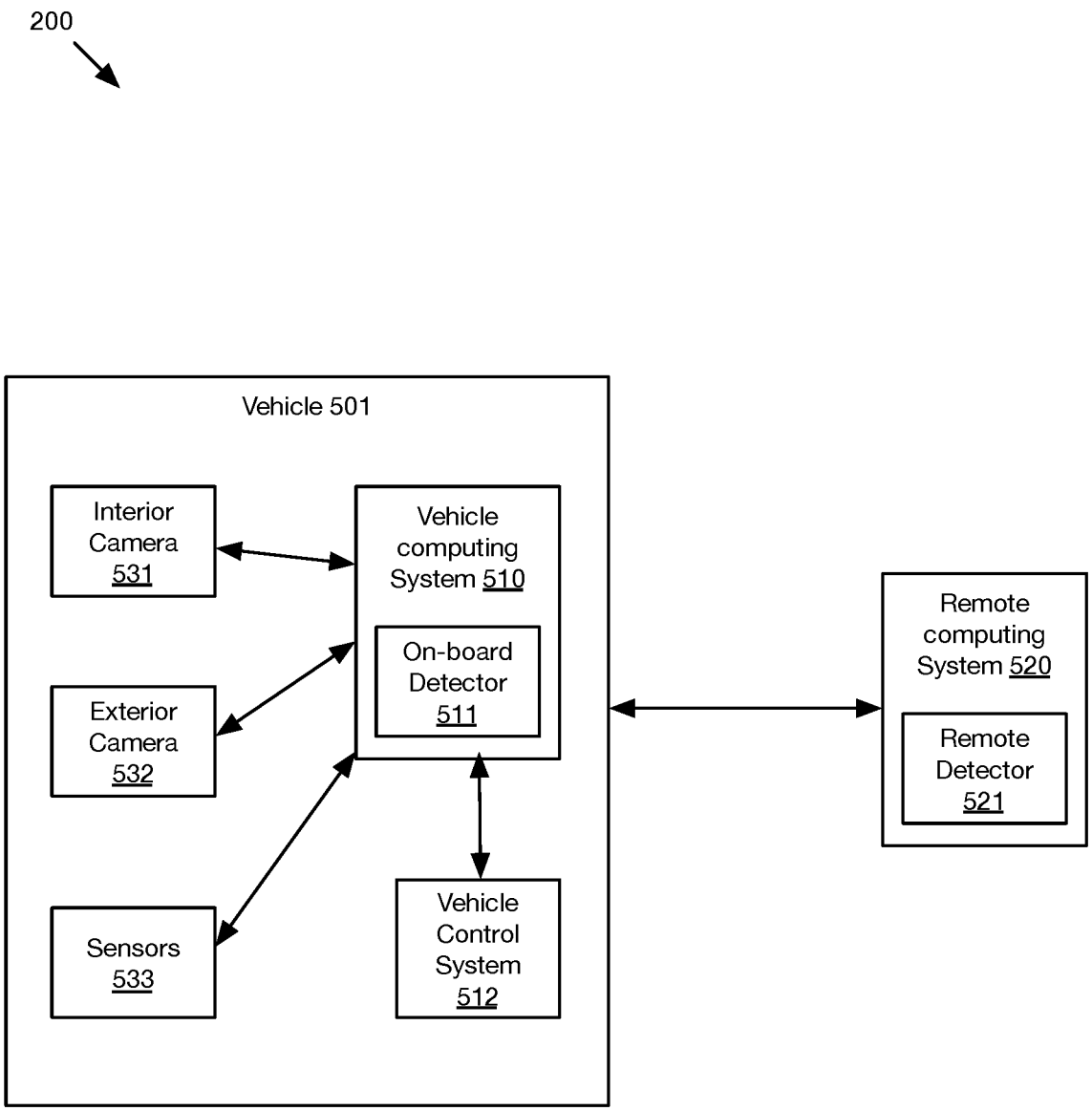
FIG. 2 depicts a schematic diagram of a variation of the system for distributed data analysis.

In one variation, an example of which is depicted in FIG. 2, the onboard vehicle system (vehicle computing subsystem 510) includes a set of internal sensors (e.g., 531, 532, 533), a set of external sensors (e.g., 531, 532, 533), and a processing system. The internal sensors (e.g., internal-facing camera, microphones, etc.) can be directed toward and monitor the vehicle interior, more preferably the driver volume but alternatively or additionally any suitable interior volume. The external sensors (e.g., exterior-facing camera 532) are preferably directed toward the vehicle exterior, more preferably toward a region in front of the vehicle (e.g., region preceding the vehicle along the vehicle trajectory, region proximal the driving volume and encompassing the vehicle drivetrain longitudinal vector, etc.), but can alternatively be directed toward the vehicle side(s), top, bottom, rear, or any other suitable region exterior the vehicle. The interior and exterior sensors are preferably statically mounted to each other (e.g., by a common housing, such as a housing of the onboard vehicle system), wherein the housing can optionally house the processing system executing the local detector(s). Additionally or alternatively, the interior and exterior sensors (e.g., cameras) can be mounted to the vehicle body (e.g., dashboard, rear view mirror, etc.) or to any other suitable mounting surface. The sensors (e.g., 531-533) are preferably statically mounted to the vehicle and/or each other, but can be movably mounted by a gimbal, damping system, or other motion mechanism. The sensors can be synchronized (e.g., share a common clock), or not be synchronized (e.g., reference different clocks).

In some variations, the communication system functions to transmit interior and exterior sensor data (e.g., image data, IMU data, etc.) (e.g., synchronized, timestamped, etc.) to a remote computing system (e.g., 520). In some variations, the communication system functions to receive weights of a trained instance of an on-board detector (e.g., 511) from the remote system 520 and update the on-board detector to include the received weights.

In a variation, vehicle computing subsystem 510 includes an interior camera (e.g., 531, shown in FIG. 2) configured to generate interior image data of a vehicle and an exterior camera (e.g., 532, shown in FIG. 2) configured to generate exterior image data of the vehicle. In other variations, either one of the internal and exterior camera can be included in a housing separate from a housing of the vehicle computing subsystem 510, and communicatively coupled to the vehicle control subsystem via a communication interface. In some variations, the vehicle computing system functions to generate synchronized image data of the interior camera and the exterior camera. In some variations, the vehicle computing system includes a sensor synchronization subsystem that functions to generate synchronized sensor data. In some variations, the sensor synchronization subsystem functions to generate synchronized image data of the interior camera and the exterior camera. Additionally or alternatively, the synchronization subsystem functions to synchronize image data of the interior camera with other sensor data, including IMU data, and the like. In some variations, the sensor synchronization subsystem functions to synchronize image data from the interior camera and the exterior camera, an example of which is described in U.S. application Ser. No. 16/011,437, filed 18 Jun. 2018, which is incorporated herein in its entirety by this reference.

In some variations, the vehicle 501 includes a vehicle control system 512 that functions to receive control inputs (e.g., control instructions) and control at least one of acceleration, braking, and steering of the vehicle 501 based on the received control inputs. In some variations, the vehicle control system 512 is included in the vehicle computing subsystem 510. In some variations, the vehicle control system 512 a subsystem that is separate from the vehicle computing subsystem 510. In some variations, the vehicle computing system 510 is communicatively coupled to a vehicle control system 512. In some variations, the vehicle computing system 510 is communicatively coupled to the vehicle control system 512 via either a bus or a local network of the vehicle 501. The vehicle computing system can control vehicle operation based on the local label (e.g., determined by the local algorithm or local detector, based on the sensor data, in real- or near-real time), based on the remote label (e.g., determined by the remote algorithm or remote detector based on the sensor data, received asynchronously from sensor data generation from the remote computing system), based on a combination thereof, based on a set of rules (e.g., based on the sensor data), or based on any other suitable set of data.

In some variations, the vehicle computing subsystem 510 is communicatively coupled to the remote computing system via a network. In some variations, the vehicle computing subsystem 510 is communicatively coupled to the remote computing system via the Internet. In some variations, the vehicle computing subsystem 510 is communicatively coupled to the remote computing system via a cellular communication link.

In some variations, the vehicle computing subsystem functions to select at least one on-board detector to disable based on operational data of the vehicle computing subsystem. In some variations, the operational data can indicate temperature, processing load, available storage capacity, power usage, or any other suitable operational parameter of the vehicle computing subsystem.

In some variations, the vehicle computing subsystem functions to select additional vehicle sensor data (sampled from the sensors 333) to send to the remote system based on an on-board label generated by an on-board detector of the vehicle computing subsystem. For example, different detected events can be associated with different frame selection criteria (e.g., different time windows or selection epochs, different frame sampling rules, different frame cropping rules, etc.).

In some variations, the vehicle computing subsystem functions to determine a severity of a vehicle event associated with an on-board label (generated by an on-board detector of the vehicle computing subsystem), select frames of the synchronized interior image data and the exterior image data of the vehicle to send to the remote system based on the determined severity, select portions of the selected frames based on the severity, and/or send the selected portions of the selected frames to the remote system.

In some variations, the vehicle computing subsystem functions to output a driver alert (e.g., user-perceptible alert) based a remote label received from the remote computing system 520.

In some variations, the vehicle computing subsystem includes a sensor synchronization subsystem, an onboard detector, and a communication system. The sensor synchronization subsystem functions to generate synchronized sensor data (e.g., generate synchronized image data of the interior camera and the exterior camera, generate synchronized image data of the interior camera and IMU data, etc.). The on-board detector includes a first computational model type and functions to detect an event from the sensor data (e.g., synchronized interior an exterior image data, synchronized interior image data with IMU data, synchronized interior sensor data and IMU data, etc.). The communication system functions to transmit the sensor data to a remote system, and the remote system includes a remote detector configured to detect the event and to generate a remote label from a data subset of the sensor data. The communication system can function to transmit the sensor data to the remote system in response to detection of the event. The remote detector can be different from the on-board detector and can be more accurate than the on-board detector. The communication system can function to receive weights of a trained instance of the on-board detector from the remote system and update the on-board detector to include the received weights. The remote system can include a training module that is configured to train the instance of the on-board detector based on the remote label and the synchronized image data. The communication system can function to select a portion of the sensor data to send to the remote system based on the detected first event, and control transmission of the selected portion to the remote system; but alternatively, the on-board detector can function to select a portion of the sensor data send to the remote system based on the detected first event, and control transmission of the selected portion to the remote system.

In some variations, the on-board detector 511 functions to detect a first event and to generate an associated on-board label from sensor data (e.g., synchronized interior image data and exterior image data of the vehicle, synchronized interior image data and IMU data of the vehicle).

Block S100 functions to obtain data indicative of vehicle operation and surroundings during a driving session (e.g., a time period in which the vehicle is being driven, about to be driven, etc.). For example, Block S100 functions to sample synchronized interior and exterior image data at a vehicle (e.g., 501 of FIG. 2). Block S100 can also function to obtain data indicative of the surroundings of a vehicle and the actions of the driver in relation to the surroundings during a driving-related scenario (e.g., a vehicle event). Block S100 can also function to determine vehicle context data, which can be used to inform performance of other Blocks of the method 100 (e.g., as an input). Block S100 is preferably performed by the edge computing subsystem (e.g., an onboard vehicle system as described above), but can additionally or alternatively be performed by integrated vehicle sensors (e.g., cameras, LIDAR, radar, ultrasonic rangefinders, any other suitable sensors, etc.) and/or any other suitable sensors and associated components (e.g., integrated computer vision chipsets, system-on-a-chip, application specific integrated circuits, etc.).

Vehicle sensor data collected in accordance with Block S100 can include synchronous data (e.g., temporally synchronous, spatially synchronized or correlated, etc.) captured from at least two cameras: a first camera oriented to image outside the vehicle, and a second camera oriented to image within the vehicle. Vehicle sensor data collected in accordance with Block S100 can include synchronous data (e.g., temporally synchronous, spatially synchronized or correlated, etc.) captured the vehicle, and a second camera oriented to image within the vehicle and at least one IMU system of the vehicle. The vehicle sensor data can additionally or alternatively include location data (e.g., GPS data), motion data (e.g., inertial measurement unit/IMU data), and any other suitable type of sensor data. The sensor data (e.g., synchronized images from inside and outside cameras) can be used to correlate driver activities (e.g., driver behavior) to events that are happening outside the vehicle (e.g., vehicle events, diving scenarios, etc.). Vehicle sensor data that is collectively aggregated from one or more data streams preferably includes two-way video data (e.g., inward facing video camera data and outward facing video camera data), and can also include inertial data, gyroscope data, location data, routing data, kinematic data, and other suitable vehicle telemetry data (e.g., collected from an OBD II port via a suitable data connection). However, vehicle sensor data can include any other suitable data.

Block S200 includes processing the vehicle sensor data.

In some variations, block S200 functions to determine vehicle event data (e.g., as described above) based on the vehicle sensor data. Block S200 can also function to process the raw sensor data and derive (e.g., extract) parameters and/or characteristics that are related to vehicle events and driver actions during vehicle events. Block S200 is preferably performed by the edge computing subsystem and/or the remote computing subsystem. Block S200 can include: determining processing tasks to be performed at the edge computing subsystem or at the remote computing subsystem S205; processing the vehicle sensor data exclusively at the edge computing subsystem S210; exchanging data (e.g., vehicle event data, vehicle sensor data) between the edge computing subsystem and the remote computing subsystem S220; and processing data exclusively at the remote computing subsystem S230.

In some variations, Block S200 can include extracting vehicle event data and driver behavior data from the vehicle sensor data. In relation to Block S200, extracting vehicle event data and/or driver behavior data can be performed by implementing a set of rules in the form of a model, such as an artificial neural network (e.g., a convolutional neural network), Bayesian model, a deterministic model, a stochastic and/or probabilistic model, and any other suitable model (e.g., any suitable machine learning as described above). Extracting data is preferably performed, at least in part, onboard the vehicle (e.g., at an onboard vehicle system, a vehicle computing unit, an electronic control unit, a processor of the onboard vehicle system, a mobile device onboard the vehicle, etc.), but can additionally or alternatively be performed at a remote computing system (e.g., a cloud-based system, a remotely-located server or cluster, etc.) subsequent to and/or simultaneously with (e.g., via streaming data) transmission of vehicle sensor data to the remote computing system.

In some variations, Block S200 can include determining the vehicle context and modifying the processing of the vehicle sensor data based on the determined vehicle context. The vehicle context can include: the host vehicle's current traffic situation (e.g., the type of road the host vehicle is driving on, the average speed of traffic, historical or real-time traffic data associated with the roadway retrieved from a database, etc.), operating conditions associated with the host vehicle (e.g., the host vehicle speed, the host vehicle route, the host vehicle geographic position, etc.), data associated with the vehicle driver (e.g., the driver identity, driver profile, driving scores associated with the driver, etc.), temporal context associated with the driving session (e.g., duration of the driving session, start time of the driving session, projected end time of the driving session, time of day, day of the month, month of the year, season of the year, etc.), environmental context (e.g., weather events during the driving session such as rain, snow, icy road conditions, temperature, etc.), and any other suitable contextual information related to the vehicle. The vehicle context is preferably determined based on the vehicle sensor data (e.g., collected in accordance with one or more variations of Block S100) and determined at the edge computing subsystem (e.g., via edge computing subsystem processing in accordance with Block S210), but can be otherwise suitably determined based on any suitable data by any suitable portion of a computing system.

Modifying the processing of the vehicle sensor data based on the vehicle context can include modulating processing requirements based on the context (e.g., adjusting the framerate of image data provided to a CNN based on the vehicle speed, wherein a lower framerate is supplied to a CNN at a lower speed corresponding to the rate at which objects depicted in the image data are moving, reducing the computational requirements associated with the CNN). However, the vehicle sensor data can be otherwise modified.

In some variations, Block S200 can also include performing combined edge-remote processing. Combined processing can include multi-layer processing, wherein a first processing layer (e.g., module, algorithm, set of explicitly programmed rules, model, etc.) is executed on the edge computing subsystem (e.g., Block S210) and a second processing layer (e.g., module, algorithm, set of explicitly programmed rules, model, etc.) directed to performing the same or similar processing task is executed on the remote computing subsystem (e.g., Block S230). For example, Block S200 can include executing a smaller (e.g., based on the number of synthetic neurons or synthetic neuron layers) CNN and/or classical computer vision algorithm (e.g., for vehicle event data extraction from images) adapted to a processing unit on the edge computing subsystem having a lower processing power, and a larger CNN on the remote computing subsystem to eliminate false positives (e.g., output by the smaller CNN). The larger CNN in this example can receive the output of the smaller CNN as input, and/or can receive the vehicle sensor data directly (e.g., to perform higher order processing operations associated with the larger CNN and compare the output to the output of the smaller CNN). In another example, Block S200 can include detecting a collision and initiating a first-notice-of-loss (FNOL) at the edge computing subsystem (e.g., at an onboard vehicle system, as described in U.S. application Ser. No. 16/11,013, filed 18 Jun. 2018, which is incorporated herein in its entirety by this reference, etc.) and performing collision analysis subsequently at the remote computing subsystem.

In some variations, Block S200 can include Block S205, which includes determining processing tasks to be performed at the edge computing subsystem or at the remote computing subsystem. Block S205 functions to split the set of processing tasks to be performed between the edge computing subsystem and the remote computing subsystem.

Figure 4:
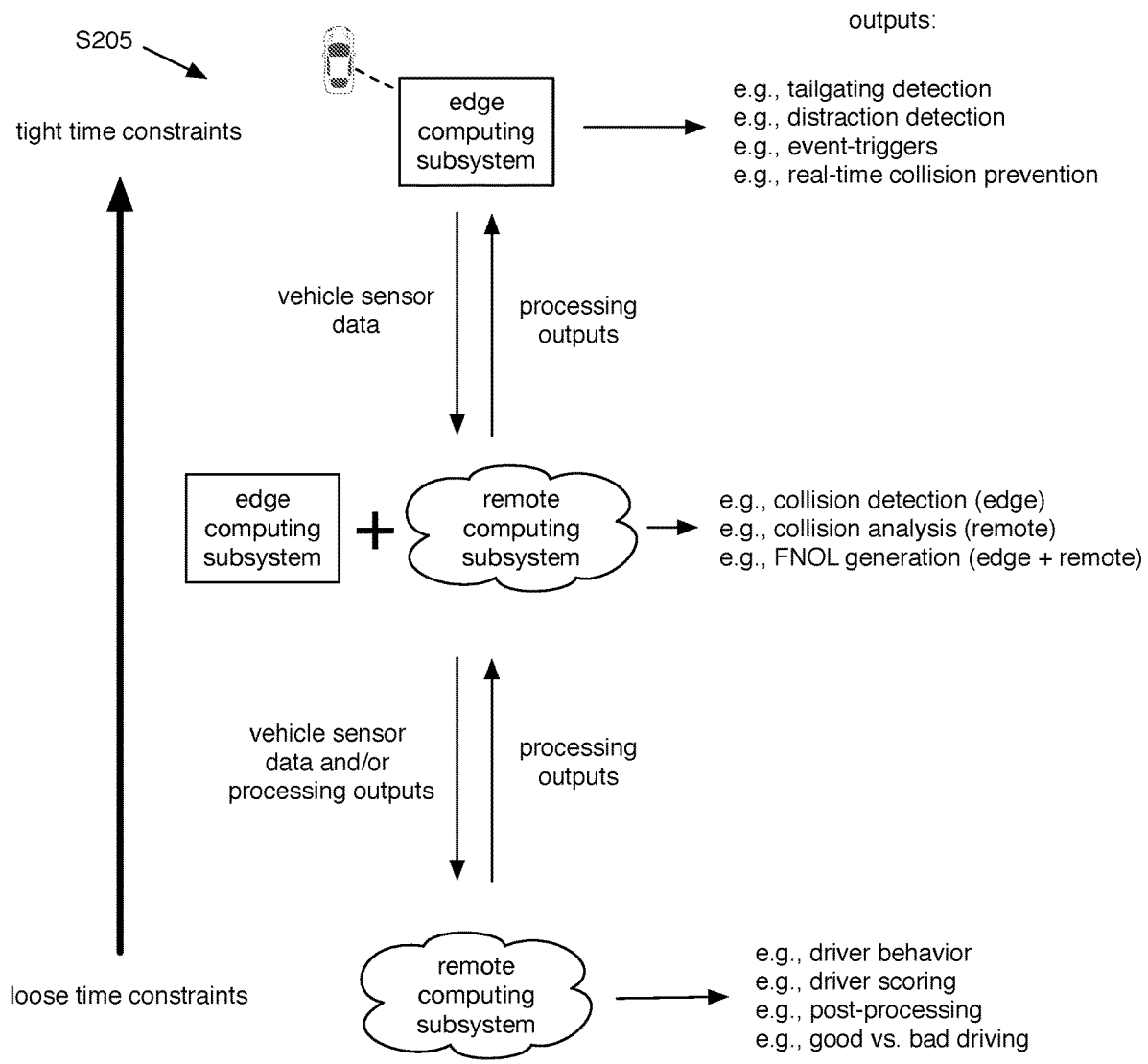
FIG. 4 depicts a schematic diagram of a variation of a portion of the method for distributed data analysis.

As shown by example in FIG. 4, Block S205 is preferably performed based on time constraints associated with the outputs of the processing tasks, wherein outputs associated with tight time constraints or events associated with high latency alerts (e.g., tailgating detection, distraction detection, etc.) are designated for performance by the edge computing subsystem, outputs associated with some tight time constraints (e.g., collision detection, near-collision detection, etc.; events that are both used to trigger high-latency alerts and used in low-latency downstream analyses) and some loose time constraints (e.g., collision analysis, near-collision analysis, etc.) are designated for performance by a combination of the edge computing subsystem and the remote computing subsystem, and outputs associated with loose time constraints or events associated with low latency analyses (e.g., driver behavior analysis, post-processing of edge-collected data, etc.) are designated for performance by the remote computing subsystem.

Block S205 can be performed dynamically. For example, Block S205 can include determining that a processing task (e.g., driver distraction detection) shall be performed at the edge computing subsystem at a first time (e.g., based on vehicle context data indicating that the vehicle is presently being driven, the driving environmental complexity, etc.), and that the processing task shall be performed at the remote computing subsystem at a second time (e.g., based on vehicle context data indicating that a driving session has concluded and detailed driver distraction analysis can be performed at the remote computing subsystem). In another example, Block S205 can include allocating a set of processing tasks between the edge computing subsystem and the remote computing subsystem based on resource availability that varies in time (e.g., based on the number of processing tasks being executed simultaneously at the edge computing subsystem, which can change depending on the vehicle context; based on the current or anticipated onboard vehicle system temperature, etc.). In another example, Block S205 can include allocating a set of processing tasks between the edge computing subsystem and the remote computing subsystem based on a variable task priority (e.g., wherein lower priority tasks are processed at the remote computing subsystem and higher priority tasks are processed at the edge computing subsystem or vice versa, wherein task priority is determined based on vehicle context, etc.). In another example, Block S205 can include allocating a set of processing tasks between the edge computing subsystem and the remote computing subsystem based on a variable task priority based on output urgency (e.g., how quickly the output is needed or can be used); the amount of data needed for the analysis (e.g., wherein urgent tasks that require high-resolution data can be processed at the edge computing system); the process type (e.g., wherein classification and regression can be performed at the edge computing system and clustering can be performed at the remote computing system); or otherwise allocated. However, Block S205 can additionally or alternatively be otherwise suitably dynamically performed.

Block S205 can additionally or alternatively be performed statically (e.g., in a predetermined manner). For example, processing tasks can be designated for performance by the edge computing subsystem based on real-time requirements (e.g., real-time driver distraction detection and warnings) and for performance by the remote computing subsystem based on accuracy requirements (e.g., low-false-positive near-collision determination for insurance-related driver risk score calculations), independently of the vehicle context. In another example, processing tasks can be designated for performance by the edge computing subsystem or the remote computing subsystem based on computational requirements (e.g., wherein a CNN comprised of a small number of synthetic neuronal layers is designated for execution at the edge computing subsystem, and a CNN comprised of a large number of synthetic neuronal layers is designated for execution at the remote computing subsystem).

However, Block S205 can additionally or alternatively be performed in any suitable manner with any suitable temporal characteristics (e.g., dynamically between driving sessions and statically within a driving session, dynamically for a first portion of a driving session and statically for a second portion of the driving session, etc.).

Block S205 can include activating and/or deactivating processing tasks (e.g., implemented as computing modules, neural networks, CNNs, etc.) performed by the edge computing subsystem and/or the remote computing subsystem based on vehicle context. In one variation, Block 205 can include: determining a driving context based on sampled measurements (e.g., using a neural network, using heuristics, using a set of rules, etc.), and selectively executing and/or deactivating a set of processing tasks (and/or selecting which model or set of layers from a model, associated with said processing task, to use) based on the driving context (e.g., wherein the processing tasks can be pre-associated with the driving context or the combination of measurement values). For example, Block S205 can include deactivating a CNN executing at the edge computing subsystem that determines driver distraction in response to determining that the host vehicle is parked and/or moving at a speed below a threshold value and activating the CNN in response to the host vehicle speed exceeding the threshold value. In another example, Block S205 can include deactivating a pedestrian detection module of the remote computing subsystem based on determining that the vehicle event data is associated with highway driving and activating the pedestrian detection module based on determining that the vehicle event data is associated with surface street navigation. However, Block S205 can additionally or alternatively include activating and/or deactivating processing modules, routines, tasks, and the like in any other suitable manner and with any other suitable basis.

Block S200 can include Block S210, which includes processing vehicle sensor data exclusively at the edge computing subsystem. Block S200 includes block S210, which functions to detect a first event based on sensor data (e.g., synchronized interior and exterior image data, synchronized interior image data and IMU data, correlated sensor data, etc.). In some variations, block S210 is performed with an on-board detector e.g., 511 of FIG. 5) that is executing on-board the vehicle, and that includes a first computational model type. In some variations, block S210 includes detecting the first event by implementing a set of rules in the form of a model, such as an artificial neural network (e.g., a convolutional neural network), Bayesian model, a deterministic model, a stochastic and/or probabilistic model, and any other suitable model (e.g., any suitable machine learning as described above).

The first event can be a driving maneuver, a near-collision, a distraction event, a collision event, or be any other suitable event.

Block S210 can also function to perform processing operations that are suitable for execution at the edge computing subsystem (e.g., processing associated with low latency, low computational resource requirements, etc.; processing tasks determined in one or more variations of Block S205; etc.). Block S210 can also function to perform processing used for real-time behaviors at the edge computing subsystem (e.g., alerts, messages, preventative control outputs or signals, etc.). Block S210 can also function to generate triggers (e.g., event-based triggers) for vehicle sensor data collection and/or processing.

Block S210 can include generating an event-based trigger. Generating the event-based trigger can include detecting a vehicle event and triggering a portion of the method 100 in response to detecting the vehicle event. In variations, detecting the vehicle event can include detecting the onset of a vehicle event (e.g., the onset of a hard braking event based on a deceleration signal exceeding a threshold deceleration value), which can be used to trigger further (e.g., subsequent, simultaneous additional, etc.) vehicle sensor data collection (e.g., activation of high resolution rangefinders based on detection of an object within a threshold radius of the host vehicle using image data). In additional or alternative variations, the method can include transmitting data in response to an event-based trigger; for example, the method can include transmitting crash data (e.g., vehicle sensor data collected during a collision, wherein the collision is determined at the edge computing subsystem) to the remote computing subsystem (e.g., for subsequent analysis) in response to determining that the collision has occurred using the edge computing subsystem (e.g., wherein such a determination acts at the event-based trigger).

Block S200 can include Block S220, which includes exchanging data with the remote computing subsystem (e.g., 520).

In some variations, Block S220 functions to transmit sensor data (e.g., synchronized interior and exterior image data, synchronized interior image data and IMU data, correlated data, etc.) to the remote system (e.g., 520). The sensor data is preferably associated with the detected event, but can alternatively or additionally be any other suitable data. The data can optionally be transmitted with: associated auxiliary sensor data (e.g., contemporaneously sampled, concurrently sampled, sensor data indicative of auxiliary events, etc.), the event label, and/or any other suitable data.

In some variations, block S220 can optionally include selecting a data subset from the sensor data (e.g., synchronized sensor data) based on a detected event, and transmit the data subset to the remote system. In some variations, block S220 includes, in response to event detection, selecting a data subset from the sensor data based on the detected event. In some embodiments, the selection of the data subset is performed by the vehicle computing subsystem. In some embodiments, the selection of the data subset is performed by an Engine Control Unit (ECU). In some embodiments, the selection of the data subset is performed by a computing subsystem of the vehicle 501. In some variations, image data of interest is selected from the sensor data based on at least one feature of the detected event, interior image data, and/or exterior image data. Detected vehicle event features can include an event label generated by the on-board detector, an event severity, and the like.

In a first variation, a video segment of the synchronized interior and exterior image data is selected based on the detected vehicle event features, and the video segment spans a window of time extending from a time of the detected event. The window of time can be adjusted based on detected severity of the event, such that the window of time increases as the detected severity increases.

In a second variation, at least one image frame of the synchronized interior and exterior image data is cropped to a region of interest based on the detected vehicle event features. Different image regions can be associated with different types of events, and the image frame can be cropped to include a region of interest associated with an event label generated by the on-board detector for the detected event. The area of the cropped region of interest can be determined by a detected severity of the detected event, such that the cropped region of interest increases as the detected severity increases.

In a variation, the on-board detector determines the severity of an event.

In some variations, block S220 samples additional vehicle sensor data from a sensor in addition to sampling data from the interior and exterior cameras, and transmit the additional sensor data to the remote system (e.g., 520). In some variations, block 220 functions to select a data subset from the additional sensor data based on a detected event, and transmit the data subset to the remote system. The additional sensor data sampled at block S220 can include location data (e.g., GPS data), motion data (e.g., inertial measurement unit/IMU data), inertial data, gyroscope data, location data, routing data, kinematic data, and vehicle telemetry data (e.g., collected from an OBD II port via a suitable data connection). However, vehicle sensor data can include any other suitable data.

In some variations, block S220 functions to reduce data redundancy in inputs provided to machine learning models (e.g., the remote detector 521) by using the vehicle computing subsystem to collect data based on detection of a vehicle event. Additionally or alternatively, data selection, processing and/or selective transmission can reduce transmission resources (e.g., bandwidth, packets, amount of transmitted data, etc.) required to send relevant data from the edge (e.g., onboard vehicle system) to the remote computing system.

In some variations, block S220 is performed in response to detection of an event by an on-board detector (e.g., 511) of the vehicle.

Block S220 is preferably performed via a wireless data communication protocol by a transmitter of the onboard vehicle system (e.g., a cellular radio, a wireless internet connection, etc.), but can additionally or alternatively be otherwise suitably performed by any suitable component (e.g., wired data transfer, shuttle transfer via removable hard drives, transmission via a transmitter integrated with the vehicle and separate from the onboard vehicle system or edge computing subsystem, etc.). Block S220 is preferably performed in real time but can additionally or alternatively be performed in non-real time (e.g., asynchronously, on demand, periodically with any suitable frequency, etc.). In. variations, Block S220 can be performed in response to an event trigger (e.g., as determined in accordance with one or more variations of Block S100 and/or Block S210).

Block S220 can include determining data requirements of the remote computing subsystem and/or communication connection (e.g., signal strength, bandwidth, etc.) and transmitting data to the remote computing subsystem based on the data requirements. For example, Block S220 can include determining a minimum image resolution required for a particular processing module of the remote computing subsystem, and downsampling collected image data to the minimum image resolution to reduce transmission bandwidth requirements, transmission latency, and image size (e.g., for storage or temporary retention). Data requirements can be determined based on context; for example, Block S220 can include determining which processing modules (e.g., networks, CNNs, etc.) are actively being used at the remote computing subsystem, and only transmitting factors (e.g., extracted from the vehicle sensor data at the edge computing subsystem) needed by the active processing modules to the remote computing subsystem.

In relation to Block S220, transmitted data can be vehicle sensor data (e.g., raw vehicle sensor data), vehicle event data (e.g., processed outputs of the edge computing subsystem), and/or any combination of vehicle sensor data, vehicle event data, and any other suitable data.

In some variations, the vehicle computing subsystem 521 stores at least one of data and processor-executable instructions that specifies data to collect for each of a set of vehicle events. As an example, the vehicle computing subsystem 521 can store a table that identifies sensors from which to collect data in response to detection of a near-collision.

In some variations, the vehicle computing subsystem 521 stores a table that identifies sensors from which to collect data in response to detection of a driver distraction event.

In some variations, the vehicle computing subsystem 521 stores a table that identifies, for each of a plurality of driving maneuvers, sensors from which to collect data in response to detection of the associated driving maneuver.

In some variations, the vehicle computing subsystem 521 stores a table that identifies sensors from which to collect data in response to detection of tailgating.

In some variations, the vehicle computing subsystem 521 stores a table that identifies sensors from which to collect data in response to detection of collision.

In some variations, the vehicle computing subsystem 521 stores a table that identifies sensors from which to collect data in response to detection of a driving violation.

In some variations, the vehicle computing subsystem 521 stores a table that identifies sensors from which to collect data in response to detection of an event indicating performance by the driver of an unaccepted driving practice.

In some variations, the vehicle computing subsystem 521 stores processor executable instructions that control the vehicle computing subsystem 521 to extract a portion of a frame of image data collected by a camera (e.g., 531, 531) that corresponds to a region of interest for a detected event (e.g., the first event).

In some variations, the vehicle computing subsystem 521 stores processor executable instructions that control the vehicle computing subsystem 521 to extract a portion of a frame of image data collected by a camera (e.g., 531, 531) that corresponds to a detected face in response to detection of a driving behavior event.

In some variations, the vehicle computing subsystem 521 stores processor executable instructions that control the vehicle computing subsystem 521 to extract a portion of a frame of image data collected by a camera (e.g., 531, 531) that corresponds to a detected face in response to detection of a diver distraction event (e.g., as disclosed in U.S. application Ser. No. 16/239,326 filed 3 Jan. 2019, incorporated herein in its entirety by this reference).

In some variations, the vehicle computing subsystem 521 stores processor executable instructions that control the vehicle computing subsystem 521 to extract a portion of a frame of image data collected by a camera (e.g., 531, 531) that corresponds to a detected face in response to detection of an event for which driver identification is relevant (e.g., as disclosed in U.S. application Ser. No. 16/160,809 filed 15 Oct. 2018, incorporated herein in its entirety by this reference).

In some variations, the vehicle computing subsystem 521 automatically labels the vehicle event data collected in response to detection of the first event with information indicating a vehicle event type of the collected data. In some embodiments, the first event includes at least one of a driving maneuver and a near-collision event, and data collected in response to detection of the first event includes at least one of vehicle event data indicating hard braking, passing of a neighboring vehicle, and/or participating in a near-collision.

In some variations, the vehicle computing subsystem 521 automatically labels the vehicle event data collected in response to detection of the first event with the on-board label, which identifies the detected first event (e.g., a driving maneuver, a near-collision event, and the like).

In some variations, block S220 includes determining a severity of an event detected by the on-board detector. In some variations, block S220 functions to control the vehicle computing subsystem 510 to select frames of the interior image data and the exterior image data to send to the remote system 520 based on the determined severity of the first event, select portions of the selected frames based on the severity, and send the selected portions of the selected frames to the remote system 520.

In some variations, block S220 functions to control the vehicle computing subsystem 510 to select frames of the interior image data and the exterior image data to send to the remote system 520 based on the determined severity of the first event, and send the selected frames to the remote system 520. Selecting frames can include selecting frames having different poses of at least first object. Selecting frames can include selecting frames having different lighting values.

A number of selected frames can be determined based on severity, such that more frames are selected for more severe events. If severity is above a severity threshold, a video clip can be selected from the image data. A length of the video clip can be determined based on severity, such that a longer video clip is selected for more severe events.

Block S200 can include Block S230, which includes processing data exclusively at the remote computing subsystem. In some variations, block S230 functions to determine a remote label based on the sensor data received from the vehicle (e.g., 501). In some variations, the remote computing subsystem receives additional vehicle sensor data (in addition to the image data) at block S220; and at block S230, the remote detector determines the remote label based the sampled additional vehicle sensor data as well as the sensor data.

In some variations, image data received from the vehicle computing subsystem at block S220 can be tagged with an on-board label generated by an on-board detector (e.g., 511) of the vehicle computing subsystem 520. Additional sensor data received from the vehicle computing subsystem at block S220 can be tagged with an on-board label generated by an on-board detector (e.g., 511) of the vehicle computing subsystem 520. At least one of image data and additional sensor data (received from the vehicle computing subsystem at block S220) can be tagged with information indicating a vehicle event type (e.g., as hard braking, passing a neighboring vehicle, participating in a near-collision, etc.). The data received from the vehicle computing subsystem at block S220 can be data sampled at a time of detection of an event, data sampled within a time window that includes a time of detection of the first event, or data sampled during a vehicle trip during which the first event is detected.

In some variations, the remote system 520 aggregates the received data according to a vehicle trip. In some variations, the remote system aggregates the received data according to a vehicle trip based on time stamps. In some variations, when a new image frame is received from the vehicle control subsystem 510, the remote system determines whether it has already received an image frame (from the vehicle control subsystem 510) with a time stamp within a predetermined period (e.g., 5 min) before or within the predetermined period after the time stamp of the new image frame; if the remote system has already received an image frame (from the vehicle control subsystem 510) with a time stamp within the predetermined period (e.g., 5 min) before or within the predetermined period after the time stamp of the new image frame, then the remote system associates the newly received image frame and the already received image frame with a same trip. If the remote system has already received (from the vehicle control subsystem 510) an image frame with a time stamp with the predetermined period (e.g., 5 min) before and an image frame with a time stamp with the predetermined after the time stamp of the new image frame, then the remote system associates newly received image frame and the two already received image frames with a same trip.

In some variations, the remote detector is associated with a specific event and includes a computational model type different from a computational model type used by an on-board detector of the vehicle that is also associated with the event. In some variations, the remote detector is more accurate than the on-board detector. In some variations, block S230 is performed in response to detection of a first event by an on-board detector of the vehicle (e.g., 501).

In some variations, Block S230 can function to perform data analysis and processing tasks that are suited for higher computational power (e.g., a computing cluster, a cloud computing service, etc.) than is available at the edge computing subsystem. Block S230 can also function to perform processing tasks related to driver coaching (e.g., analyzing good versus bad driver behavior over time, detecting good driver behavior, detecting bad driver behavior). Block S230 can also function to perform post-processing of edge-triggered (e.g., event-triggered) data (e.g., collision analysis after occurrence of a collision). Block S230 can also function to perform processing tasks designated for performance by the remote computing subsystem (e.g., in accordance with one or more variations of Block S205, based on the existence of few or no temporal response constraints, etc.). Block S230 can include performance of any suitable processing tasks as described above (e.g., vehicle event data extraction, event trigger determination, driver scoring, the remote layer of a multi-layer processing scheme, etc.), and/or any other suitable processing tasks.

In variations, Block S230 can include determining driver behavior and/or vehicle event data, including determining a driver distraction score and/or scoring a driver based on distraction and/or driving skill, substantially as described in U.S. application Ser. No. 15/805,348, filed 7 Nov. 2017, which is incorporated herein in its entirety by this reference.

Block S230 can functions to more accurately label sensor data underlying a detected event (by generating a remote label using the remote detector). The remote label can be used as training data for subsequent on-board detector training at the remote system 520, used as the true label for subsequent analyses, or otherwise used. The training of the on-board detector at the remote system 520, can be used to update the on-board detector at the vehicle 501 such that the updated on-board detector (e.g., 511) can determine a more accurate label to associate with at least one of a driving session (trip) and a driver.

In some variations, the remote system 520 includes more than one remote detector, as described herein.

In some variations, a remote detector (e.g., 521) has a greater accuracy than the on-board detector used to detect the first event. In some variations, the remote detector generates a lower percentage of false-positive results than the on-board detector used to detect the first event. In some variations, the remote detector has higher latency than the on-board detector used to detect the first event. In some variations, the remote detector has higher latency than the on-board detector used to detect the first event. In a variation, the remote detector is larger than the on-board detector used to detect the first event. In some variations, the remote detector has more layers than the on-board detector used to detect the first event. In some variations, the remote detector requires more computing power to run than the on-board detector used to detect the first event. In some variations, the remote detector requires more memory than the on-board detector used to detect the first event. In some variations, the remote detector requires more storage than the on-board detector used to detect the first event. In some variations, the remote detector processes more input features than the on-board detector used to detect the first event. In some variations, the remote detector consumes more energy than the on-board detector used to detect the first event.

In some variations, the remote detector and the on-board detector function to detect a same event. In some variations, the remote detector and the on-board detector function to detect a same type of event. In some variations, the remote detector and the on-board detector implement different models. In some variations, the remote detector and the on-board detector implement different model types. In some variations, the remote detector and the on-board detector function to detect different events. In some variations, the remote detector and the on-board detector function to detect different types of events. In some variations, the on-board detector functions to detect downstream events related to operation of the vehicle 501 and the remote detector functions to detect upstream events related to analysis of vehicle operation of the vehicle 501. In some variations, the on-board detector functions to perform real-time event detection and the remote detector functions to perform event detection for use in asynchronous processing. In some variations, the on-board detector is a first layer of an model and the remote detector is a second layer of the model, wherein the on-board detector functions to generate at least one feature that is used by the remote detector.

In some variations, the on-board detector and the remote detector are the same computational model type. In a variation, the on-board detector and the remote detector are different computational model types. Computational model types can include convolutional neural networks (CNN) and deep neural networks (DNN). In a variation, the on-board detector is one of a heuristics-based detector and a rule-based detector, and the remote detector is one of a CNN and a DNN.

In some variations, the remote detector is used to process the data received from the vehicle computing subsystem 520 to generate a remote label used for at least one of collision analysis, driver behavior analysis, and driver scoring, as described herein. In some variations, the remote detector is used to process the data received from the vehicle computing subsystem 520 to generate a remote label used for FNOL generation. In some variations, the remote detector is used to process the data received from the vehicle computing subsystem 520 to generate a remote label used identify at least one of good driving and bad driving.

The method can include Block S300, which includes generating output related to vehicle control. Block S300 functions to enhance vehicle control based on the processing performed at the edge computing subsystem (by using the on-board label) and/or remote computing subsystem (by using the remote label provided by the remote system 520).

Block S300 can also function to provide real-time information at the edge computing subsystem (e.g., to a driver of the host vehicle).

In variations, Block S300 can be performed at the edge computing subsystem (e.g., to generate outputs in real-time or near real-time). In additional or alternative variations, Block S300 can be performed at the remote computing subsystem (e.g., to perform analysis of aggregated vehicle data, determining a driver score associated with good versus bad driver behavior occurring over time and/or providing the driver score to the driver, etc.). Aspects of output generation can additionally or alternatively be performed at a combination of the edge and remote computing subsystems.

Block S300 can include generating alerts based on vehicle event data determined in Block S200 and providing the alerts to the driver in substantially real-time. For example, Block S300 can include alerting the driver in order to prevent a likely collision, wherein Block S200 includes detecting a vehicle encroaching upon a predicted trajectory of the host vehicle.

In some variations, block S300 is performed by the vehicle computing subsystem (e.g., 510).

In some variations, block S300 functions to generate an alert based on a detected event and provide the alert to a user interface of the vehicle.

In some variations, the user interface is provided by the vehicle computing subsystem 510. In some variations, the user interface is provided by a user interface subsystem of the vehicle 501. In some variations, the user interface is a graphical user interface displayed by a display device. In some variations, the display device is included in the vehicle computing subsystem 510. In some variations, the user interface is a light included in the vehicle computing subsystem. In some variations, the user interface is a speaker included in the vehicle computing subsystem. In some variations, the user interface is a haptic feedback device included in the vehicle computing subsystem. In some variations, the user interface is a haptic feedback device included in a control device of the vehicle 501. In some variations, the control device is a steering wheel. In some variations, the user interface is a haptic feedback device included in a driver seat of the vehicle 501.

In some variations, block S300 functions to generate an alert based on a detected event and provide the alert to a vehicle control system (e.g., 512), and the vehicle control system controls the vehicle 501 based on the alert.

In some variations, the alert specifies a detected event that triggers the alert. In some variations, the alert specifies a detected event that triggers the alert, and the vehicle control system 512 generates a vehicle control instruction (e.g., acceleration control instruction, deceleration control instruction, breaking control instruction, steering control instruction) based on the alert and provides the control instruction to a control subsystem (e.g., acceleration control subsystem, deceleration control subsystem, breaking control subsystem, steering control subsystem). In some variations, the alert specifies a vehicle breaking control instruction. In some variations, the alert specifies a vehicle acceleration control instruction. In some variations, the alert specifies a vehicle deceleration control instruction. In some variations, the alert specifies a vehicle steering control instruction. In some variations, the vehicle control system 512 is a drive-by-wire system of the vehicle 501. In some variations, the vehicle control system 512 is provided by a manufacturer of the vehicle 501, and the vehicle computing subsystem 510 is manufactured by a separate entity. In some variations, the vehicle control system 512 is provided by a $3^{rd}$ party manufacturer that is different from both the entity that manufactures the vehicle 501 and the entity that manufactures the vehicle computing subsystem 510.

The method can include Block S400, which includes modifying operation of the edge computing subsystem based on outputs of the remote computing subsystem.

Block S400 functions to utilize the processing performed at the remote computing subsystem to improve the processing performance of the edge computing subsystem. Block S400 can also function to enhance the accuracy of processing tasks performed by the edge computing subsystem. Block S400 can include updating processing modules (e.g., CNN weights, algorithmic tuning parameters, computing modules, etc.) based on the outputs of related processing modules (e.g., weight factors output by a machine learning model) executing at the remote computing subsystem.

In a specific example, the method includes executing tailgating detection (e.g., via a first CNN), distraction detection (e.g., via a second CNN), and collision detection (e.g., via an IMU-based explicitly programmed set of rules) at the edge computing subsystem, and executing collision analysis (e.g., via a first set of CNNs), driver behavior analysis (e.g., via a second set of CNNs), and driver scoring (e.g., via a predetermined deterministic set of scoring rules) at a remote computing subsystem (e.g., cloud-based system) communicatively coupled to the edge computing subsystem.

In another specific example, the method includes executing a first processing layer of a collision determination algorithm (e.g., a first set of synthetic neuron layers of a CNN or other network that define a first processing layer, a low complexity or low resolution implementation of a machine learning model, a deterministic set of rules that generates a set of inputs for a downstream processing layer of a learning network, etc.) at an edge computing subsystem, and executing a second processing layer of the collision determination algorithm (e.g., a second set of synthetic neuron layers of the CNN or other network, a high complexity or high resolution implementation of the machine learning model, etc.) at a remote computing subsystem in communication with the edge computing system. In this example, the first processing layer can be tuned to have high recall characteristics and low precision relative to the second processing layer (e.g., providing a negligible probability of missing collision events and having a relatively higher probability of generating false positives), and the second processing layer can be tuned to have high precision relative to the first processing layer (e.g., providing false positive rejection). In this example, the second processing layer can process or otherwise suitably analyze the output of the first processing layer; additionally or alternatively, the second processing layer can process the same inputs (e.g., vehicle event data) as the first processing layer upon triggering by the edge computing subsystem (e.g., based on a trigger generated based on the output of the first processing layer).

In some variations, block S400 can function to provide the remote label to the vehicle (e.g., 501).

In some variations, the method includes: training an instance of the on-board detector based on the remote label and the data received from the vehicle (e.g., 501. In some variations, the training is performed by at a training module executing at the remote system 520.

In a first variation, the method can include updating the on-board detector executing at the vehicle based on the trained instance of the on-board detector. In some variations, updating the on-board detector includes: providing weights of the trained instance of the on-board detector to the on-board detector, updating the on-board detector to include the weights received from the remote system.

In a second variation, the method can include transmitting the entire retrained on-board detector to the vehicle, and replacing the on-board detector at the vehicle with the retrained on-board detector.

Referring back to FIG. 2, in some variations, the on-board detector 511 functions to detect a first event and to generate an associated on-board label from synchronized sensor data and exterior image data of the vehicle.

In some variations, the on-board detector is configured to detect a vehicle event, based on vehicle event data collected by the vehicle computing subsystem 510 as described herein. In some variations, the vehicle computing subsystem functions to collect vehicle event data generated by at least one sensor (e.g., 533). In some variations, the vehicle computing subsystem is constructed to collect vehicle event data generated by a data receiving unit of the vehicle 501. In some variations, a data receiving unit is a network interface device. In some variations, a data receiving unit is a radio receiver. In some variations, a data receiving unit is a GPS (Global Positioning System) receiver.

In some variations, a vehicle event detectable by the on-board detector can include a vehicle operation event, a driver behavior event, and/or a vehicular traffic event.

In some variations, vehicle event data includes data sampled by vehicle sensors of the vehicle 501 that are separate from the vehicle computing subsystem (e.g., built-in automotive sensors, and the like).

In some variations, the remote computing subsystem 520 includes a remote detector configured to detect an event and to generate a remote label from a portion of the sensor data of the vehicle (e.g., synchronized sensor data). The remote detector receives the interior image data and the exterior image data from the vehicle computing system, and the remote detector is different from the on-board detector and is more accurate than the on-board detector.

In some variations, the remote system includes a training system that functions to train an instance of the on-board detector at the remote system based on a remote label (generated by the remote detector) and the sensor data of the vehicle (e.g., synchronized sensor data).

In some variations, the remote system functions to provide a remote label (generated by the remote detector) to the vehicle computing subsystem.

In some variations, the on-board detector and the remote detector perform detection for a same type of event. In some variations, the on-board detector performs detection by implementing a first type of model and the remote detector performs detection by implementing second type of model. In some variations, the remote detector is more accurate than the on-board detector.

In some variations, the on-board detector performs regression and the remote detector performs classification.

In some variations, the on-board detector and the remote detector function to generate labels for vehicle collisions.

In some variations, the on-board detector and the remote detector function to generate labels for FNOL generation.

In some variations, the on-board detector and the remote detector function to generate labels for driver behavior.

In some variations, the vehicle includes a plurality of on-board detectors, and the vehicle computing subsystem functions to select at least one on-board detector to disable based on operational data. Operational data can include one or more of temperature, processing load, available storage capacity, and power usage of the vehicle computing subsystem, and any other suitable operational parameter. In some variations, the vehicle computing subsystem functions to select at least one on-board detector to disable based on vehicle event data, as describe herein. As an example, if the vehicle is not moving, as indicated by the vehicle event data, one of a tailgating detector, a collision detector, a pedestrian detector, a driver ID detector, and a driver distraction detector can be disabled. As an example, if the vehicle begins to move, as indicated by the vehicle event data, one of a tailgating detector, a collision detector, a pedestrian detector, driver ID detector, and a driver distraction detector can be enabled.

The method of the preferred embodiment and variations thereof can be embodied and/or implemented at least in part as a machine configured to receive a computer-readable medium storing computer-readable instructions. The instructions are preferably executed by computer-executable components preferably integrated with a suitable system and one or more portions of a processor or controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components (e.g., system or component variants) and the various method processes (e.g., method or process variants), wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

What is claimed is:

1. A method for distributed event detection, comprising:
   at a vehicle, sampling synchronized interior and exterior image data;
   with an on-board detector executing on-board the vehicle, the on-board detector comprising a first computational model type:
   detecting a first event based on the synchronized interior and exterior image data;
   in response to first event detection, selecting a data subset from the synchronized interior and exterior image data based on the first event; and
   in response to first event detection, transmitting the data subset to a remote system; and
   with a remote detector executing at the remote system, determining a remote label based on the data subset, wherein the remote detector is associated with the first event, comprises a second computational model type different from the first computational model type, and is more accurate than the on-board detector.

2. The method of claim 1, wherein the remote detector is configured to detect the first event.

3. The method of claim 1, further comprising:
   at a training module executing at the remote system, training an instance of the onboard detector based on the remote label and the data subset; and updating the on-board detector executing at the vehicle based on the trained instance of the on-board detector.

4. The method of claim 3, wherein updating the on-board detector comprises: providing weights of the trained instance of the on-board detector to the onboard detector, wherein the on-board detector is updated to include the weights received from the remote system.

5. The method of claim 1, wherein the data subset is transmitted from the vehicle to the remote system in response to detection of the first event.

6. The method of claim 1, wherein the remote detector and the on-board detector are different types of detectors, and the remote detector is more accurate than the on-board detector.

7. The method of claim 1, wherein the vehicle includes a plurality of on-board detectors, and the method further comprising: selecting at least one on-board detector to disable based on operational data of the vehicle, wherein the operational data indicates at least one of temperature, processing load, available storage capacity, and power usage of the vehicle computing subsystem.

8. The method of claim 1, wherein the on-board detector and the remote detector are configured to detect vehicle collisions.

9. The method of claim 1, wherein the on-board detector and the remote detector are configured to generate labels for first-notice-of-loss (FNOL) generation.

10. The method of claim 1, wherein the on-board detector and the remote detector are configured to generate labels for driver behavior.

11. The method of claim 1, further comprising:
in response to first event detection: generating an on-board label for the first event with the on-board detector; and
transmitting the on-board label to the remote system in association with the data subset.

12. The method of claim 11, further comprising, in response to generation of the onboard label:
selecting additional vehicle sensor data to send to the remote system based on the on-board label; and
transmitting the selected additional vehicle sensor data to the remote system in association with the data subset;
wherein the remote detector determines the remote label based on the data subset and at least one of the on-board label and the additional vehicle sensor data.

13. A vehicle computing system comprising:
an interior camera configured to generate interior image data of a vehicle;
an exterior camera configured to generate exterior image data of the vehicle;
a sensor synchronization subsystem configured to generate synchronized image data of the interior camera and the exterior camera;
an on-board detector comprising a first computational model type, and configured to detect a first event from the synchronized image data; and
a communication system configured to transmit the synchronized image data to a remote system;
wherein the remote system comprises a remote detector configured to detect the first event and to generate a remote label from at least a data subset of the synchronized image data;
wherein the communication system is configured to receive weights of a trained instance of the on-board detector from the remote system and update the on-board detector to include the received weights; and wherein the remote system comprises a training module that is configured to train the instance of the on-board detector based on the remote label and the synchronized image data.

14. The system of claim 13, wherein the communication system is configured to transmit the synchronized image data to the remote system in response to detection of the first event.

15. The system of claim 13, wherein the remote detector and the on-board detector are different types of detectors, wherein the remote detector is more accurate than the on-board detector.

16. A vehicle computing system comprising:
an interior camera configured to generate interior image data of a vehicle;
an exterior camera configured to generate exterior image data of the vehicle;
a sensor synchronization subsystem configured to generate synchronized image data of the interior camera and the exterior camera;
an on-board detector comprising a first computational model type, and configured to detect a first event from the synchronized image data; and
a communication system configured to transmit the synchronized image data to a remote system;
wherein the remote system comprises a remote detector configured to detect the first event and to generate a remote label from at least a data subset of the synchronized image data; and
wherein at least one of the communication system and the on-board detector is configured to select a portion of the synchronized image data send to the remote system based on the detected first event, and to control transmission of the selected portion to the remote system.

17. The system of claim 16, wherein the communication system is configured to transmit the synchronized image data to the remote system in response to detection of the first event.

18. The system of claim 16, wherein the remote detector and the on-board detector are different types of detectors, wherein the remote detector is more accurate than the on-board detector.

19. A system comprising:
an on-board detector of a vehicle configured to detect a first event and to generate an associated on-board label from synchronized interior image data and exterior image data of the vehicle; and
a remote detector of a remote system, the remote detector configured to detect the first event and to generate a remote label from at least a portion of the synchronized interior image data and exterior image data of the vehicle, wherein the remote detector receives the interior image data and the exterior image data from the vehicle;
wherein the remote detector and the on-board detector are different types of detectors;
wherein the remote detector is more accurate than the on-board detector; and
wherein in response to generation of the on-board label, the on-board detector is configured to select additional vehicle sensor data to send to the remote system based on the on-board label, and transmit the selected additional vehicle sensor data to the remote system in association with the interior image data and the exterior image data.

20. A system comprising:

an on-board detector of a vehicle configured to detect a first event and to generate an associated on-board label from synchronized interior image data and exterior image data of the vehicle; and a remote detector of a remote system, the remote detector configured to detect the first event and to generate a remote label from at least a portion of the synchronized interior image data and exterior image data of the vehicle;

wherein the remote detector receives the interior image data and the exterior image data from the vehicle, wherein the remote detector and the on-board detector are different types of detectors;

wherein the remote detector is more accurate than the on-board detector; and wherein the on-board detector is configured to update weights used by the onboard detector with updated weights received from the remote system, the updated weights being weights of a trained instance of the on-board detector trained by the remote system.

* * * * *